US008619976B2

(12) United States Patent
Suzaki et al.

(10) Patent No.: US 8,619,976 B2
(45) Date of Patent: Dec. 31, 2013

(54) ENCRYPTION METHOD, DECRYPTION METHOD, DEVICE, AND PROGRAM

(75) Inventors: Tomoyasu Suzaki, Minato-ku (JP); Yukiyasu Tsunoo, Minato-ku (JP); Hiroyasu Kubo, Hakusan (JP); Maki Shigeri, Hakusan (JP); Teruo Saito, Hakusan (JP); Takeshi Kawabata, Hakusan (JP); Hiroki Nakashima, Hakusan (JP)

(73) Assignees: NEC Corporation, Tokyo (JP); NEC Software Hokuriku, Ltd., Ishikawa (JP)

( * ) Notice: Subject to any disclaimer, the term of this patent is extended or adjusted under 35 U.S.C. 154(b) by 337 days.

(21) Appl. No.: 12/747,944

(22) PCT Filed: Dec. 11, 2008

(86) PCT No.: PCT/JP2008/072577
§ 371 (c)(1),
(2), (4) Date: Jun. 14, 2010

(87) PCT Pub. No.: WO2009/075337
PCT Pub. Date: Jun. 18, 2009

(65) Prior Publication Data
US 2010/0266122 A1 Oct. 21, 2010

(30) Foreign Application Priority Data
Dec. 13, 2007 (JP) ................... 2007-322021

(51) Int. Cl.
*H04K 1/00* (2006.01)
(52) U.S. Cl.
USPC ........................................... 380/28

(58) Field of Classification Search
None
See application file for complete search history.

(56) References Cited

U.S. PATENT DOCUMENTS

| 6,769,063 B1 * | 7/2004 | Kanda et al. ................... 713/193 |
| 8,165,288 B2 * | 4/2012 | Shibutani et al. ............... 380/28 |
| 2005/0226407 A1 * | 10/2005 | Kasuya et al. ................. 380/28 |
| 2010/0091991 A1 * | 4/2010 | Shibutani et al. ............. 380/259 |

FOREIGN PATENT DOCUMENTS

| JP | 2003-345244 A | 12/2003 |
| JP | 2006-301567 A | 11/2006 |
| JP | 2007-192893 A | 8/2007 |
| JP | 2007-199156 A | 8/2007 |

OTHER PUBLICATIONS

Heys, Howard M., and Stafford E. Tavares. "The design of substitution-permutation networks resistant to differential and linear cryptanalysis." In Proceedings of the 2nd ACM Conference on Computer and communications security, pp. 148-155. ACM, 1994.*

(Continued)

*Primary Examiner* — Jeffrey Pwu
*Assistant Examiner* — Carlos Amorin
(74) *Attorney, Agent, or Firm* — Sughrue Mion, PLLC

(57) ABSTRACT

An encryption/decryption method comprises by using a generalized Feistel structure in which data is divided into n pieces and mixing processing with key data is performed, diffusion processing, in which data transformation via linear operation is executed, is performed at least once between rounds of the generalized Feistel structure, wherein. As the diffusion processing, linear transformation is performed in which each of n pieces of output data is operated on by two or more pieces of input data. The method is adapted for encryption or decryption.

8 Claims, 18 Drawing Sheets

(56) References Cited

OTHER PUBLICATIONS

Yukiyasu Tsunoo, et al., "Impossible Differentials for Two Types of Extended Feistel Structure", The 2007 Symposium on Cryptography and Information Security, Jan. 23, 2007, pp. 1-6.

Mitsuru Matsui, et al., "Block Encryption Algorithm MISTY", Technical report of IEICE, ISEC, Jul. 1996, pp. 35 to 48, URL:http://ci.nii.ac.jp/naid/110003296962/.

Masayuki Kanda, et al., "A round function structure consisting of few s-boxes (Part III)", Technical Report of the Institute of Electronics, Information and Communication Engineers, ISEC98-3, pp. 21-30.

* cited by examiner

FIG. 2

$$\begin{Bmatrix} y_1 \\ y_2 \\ \vdots \\ y_{n-1} \\ y_n \end{Bmatrix} = \begin{pmatrix} a_{1,1} & a_{1,2} & \cdots\cdots & a_{1,n-1} & a_{1,n} \\ a_{2,1} & a_{2,2} & & & \vdots \\ \vdots & & \ddots & & \vdots \\ \vdots & & & & x_{n-1} \\ a_{n,1} & a_{n,2} & \cdots\cdots & a_{n,n-1} & a_{n,n} \end{pmatrix} \begin{Bmatrix} x_1 \\ x_2 \\ \vdots \\ x_{n-1} \\ x_n \end{Bmatrix}$$

$y_1 = a_{1,1} \cdot x_1 \oplus a_{1,2} \cdot x_2 \oplus \ldots \oplus a_{1,n-1} \cdot x_{n-1} \oplus a_{1,n} \cdot x_n$
$y_2 = a_{2,1} \cdot x_1 \oplus a_{2,2} \cdot x_2 \oplus \ldots \oplus a_{2,n-1} \cdot x_{n-1} \oplus a_{2,n} \cdot x_n$
$\vdots$
$y_n = a_{n,1} \cdot x_1 \oplus a_{n,2} \cdot x_2 \oplus \ldots \oplus a_{n,n-1} \cdot x_{n-1} \oplus a_{n,n} \cdot x_n$

FIG. 3

$$\begin{pmatrix} y_1 \\ \vdots \\ y_i \end{pmatrix} = \begin{pmatrix} a_{1,1} & \cdots & a_{1,i} \\ \vdots & \ddots & \vdots \\ a_{i,1} & \cdots & a_{i,i} \end{pmatrix} \begin{pmatrix} x_1 \\ \vdots \\ x_i \end{pmatrix}$$

$$\begin{pmatrix} y_{i+1} \\ \vdots \\ y_j \end{pmatrix} = \begin{pmatrix} a_{i+1,i+1} & \cdots & a_{1,i} \\ \vdots & \ddots & \vdots \\ a_{j,i+1} & \cdots & a_{j,j} \end{pmatrix} \begin{pmatrix} x_{i+1} \\ \vdots \\ x_j \end{pmatrix}$$

$$\vdots \qquad \vdots \qquad \vdots$$

$$\begin{pmatrix} y_k \\ \vdots \\ y_n \end{pmatrix} = \begin{pmatrix} a_{k,k} & \cdots & a_{k,n} \\ \vdots & \ddots & \vdots \\ a_{n,k} & \cdots & a_{n,n} \end{pmatrix} \begin{pmatrix} x_k \\ \vdots \\ x_n \end{pmatrix}$$

FIG. 11

$$\begin{bmatrix} y_0 \\ y_1 \\ y_2 \\ y_3 \end{bmatrix} = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \begin{bmatrix} x_0 \\ x_1 \\ x_2 \\ x_3 \end{bmatrix}$$

$$y_0 = 2 \cdot x_0 \oplus 3 \cdot x_1 \oplus x_2 \oplus x_3$$
$$y_1 = x_0 \oplus 2 \cdot x_1 \oplus 3 \cdot x_2 \oplus x_3$$
$$y_2 = x_0 \oplus x_1 \oplus 2 \cdot x_2 \oplus 3 \cdot x_3$$
$$y_3 = 3 \cdot x_0 \oplus x_1 \oplus x_2 \oplus 2 \cdot x_3$$

FIG. 17
RELATED ART

| NUMBER OF DIVISIONS N | NUMBER OF IMPOSSIBLE DIFFERENTIAL ROUNDS ||
|---|---|---|
| | Type-I | Type-II |
| 2 | 5 ||
| 4 | 19 | 9 |
| 8 | 71 | 17 |

ENCRYPTION METHOD, DECRYPTION METHOD, DEVICE, AND PROGRAM

CROSS-REFERENCE TO RELATED APPLICATIONS

The present application claims priority from Japanese Patent Application 2007-322021 (filed on Dec. 13, 2007) the content of which is hereby incorporated in its entirety by reference into this specification.

TECHNICAL FIELD

The present invention relates to an encryption method, an encryption device, and an encryption program for concealing data, to a corresponding decryption method, decryption device, decryption program, and more particularly to those using common-key block encryption.

BACKGROUND

Common key block encryption is provided as a technology for concealing communication data and accumulated data. A representative one of the technologies is DES (Data Encryption Standard). DES employs the structure called the Feistel structure. The Feistel structure is characterized in that input data is divided into two and the mixing processing is performed. Various patents for the Feistel-type common-key block encryption processing have been applied, and the recently-applied patents include the encryption processing devices described in Patent Documents 1 and 2.

The structure created by increasing the number of data divisions, which are input into the Feistel structure, to two or more is called the generalized Feistel structure or the modified Feistel structure (hereinafter, the former "generalized Feistel structure" is used throughout this specification).

FIG. 15 is a diagram showing the one-round configuration of the generalized Feistel structure (n-way generalized Feistel structure) for encrypting/decrypting n-divided data. The number of divisions n=2 corresponds to DES described above.

In round processing 9, input data $x_1$ is output directly as output data $y_n$ and, at the same time, is mixed with the key data $K_r$ by an F function 90, which is a non-linear processing function, and combined with input data $x_2$ by an exclusive OR 91 to output the result as output data $y_1$. Other input data $x_i$ (i>2) is output directly as output data $y_{i-1}$. In the example shown in FIG. 15, non-linear transformation is performed for one piece of the divided data in one round.

FIG. 16 is a diagram showing an example of another type of the generalized Feistel structure. In the example shown in FIG. 16, non-linear transformation is performed for n/2 pieces of (divided) data in one round.

To distinguish the two generalized Feistel structures given above in the following description, the generalized Feistel structure having the structure shown in FIG. 15 is called Type-I and the generalized Feistel structure having the structure shown in FIG. 16 is called Type-II.

Non-Patent Document 1 is a document proposing an impossible differential characteristic search method for a block encryption having the generalized Feistel structure described above. Non-Patent Document 2 discloses a design method for the linear transformation layer of a round function. Note that the round function disclosed in Non-Patent Document 2 is presupposed to have the SPN structure and so its basic structure is different from the generalized Feistel structure of the present invention.

Patent Document 1
Japanese Patent Kokai Publication No. JP2007-192893A
Patent Document 2:
Japanese Patent Kokai Publication No. JP2007-199156A
Non-Patent Document 1:
Yukiyasu Tsunoo, Etsuko Tsujihara, Hiroki Nakashima, and Hiroyasu Kubo "Impossible Differentials for Two Types of Extended Feistel Structure", The 2007 Symposium on Cryptography and Information Security, Jan. 23, 2007
Non-Patent Document 2:
Masayuki KANDA, Youichi TAKASHIMA, Tsutomu MATSUMOTO, Kazumaro AOKI, and Kazuo OHTA "A round function structure consisting of few s-boxes (Part III)" Technical Report of The Institute of Electronics, Information and Communication Engineers, ISEC98-3, pp. 21-30

SUMMARY

The disclosed contents of Patent Documents and non-Patent Documents given above are hereby incorporated herein by reference thereto. The following analysis is given by the present invention. In the generalized Feistel structure, an increase in the number of divisions, n, means a decrease in the processing size of the F function. The processing of the F function is the most influential factor in the implementation size. A decrease in the processing size of the F function has the advantage of achieving small-scale implementation.

On the other hand, from the safety viewpoint, the problem is that an increase in the number of divisions, n, decreases the resistance to an impossible differential attack, one of the cryptanalysis methods.

The following describes the outline of the impossible differential attack. The impossible differential attack is an attack that uses the characteristic of the encryption algorithm that, when the difference $\alpha$ is given to the (R+1)-th round encryption algorithm (i.e., a data pair whose difference is $\alpha$ is given), the difference in the data after the R-th round never becomes $\beta$, that is, the difference $\alpha$ never becomes the difference $\beta$ with a probability of 1.

This number of rounds, R, is called the "number of impossible differential rounds". The data pair in the immediately previous round of the ciphertext pair is obtained by assuming a key after the (R+1)-th round. The difference in the obtained data pair is calculated and, if the difference is $\beta$, the assumed key is discarded and, in this way, the candidates of the key can be narrowed.

FIG. 17 is a table showing the relation between the number of divisions and the number of impossible differential rounds investigated by the search method described in Non-Patent Document 1. When the F function is bijective (i.e., one to one correspondence between all elements of the input and those of the output), the maximum number of rounds in which the impossible differential characteristic is present in the Feistel structure (n=2) is 5 and, as the number of divisions n is increased, the maximum number of impossible differential rounds is also increased. This is because the impossible differential attack uses the characteristic of the probability of 1 and, as the number of divisions n is increased, the diffusion effect of the encryption means weakens.

FIG. 18 is a diagram showing the change in the difference when the difference $\alpha$ is given to the 4-way Type-II generalized Feistel structure. Because the value of the given difference $\alpha$ is known but unknown key data is used for the F function, the value of the output difference is unknown. The calculation of the exclusive OR between an unknown difference value and another difference value, such as those of exclusive OR operations 91a and 91b in FIG. 18, sometimes results in the difference being canceled.

In the example shown in FIG. 18, the difference of the probability of 1 exists only in the first to fourth rounds. It is apparent that the path of probability of 1 will be extended if n is set larger than that of the differential path of the probability of 1 in FIG. 18.

As described above, while an increase in the number of divisions, n, in the generalized Feistel structure has the advantage of making the F function smaller, the number of rounds to which an impossible differential attack is applicable is increased. Because of this, the number of rounds of the encryption means must be increased and, as a result, there is a problem that the processing speed is decreased.

In view of the foregoing, it is an object of the present invention to provide an encryption method, an encryption device, and an encryption program, as well as a corresponding (or mating) decryption method, decryption device, decryption program, for increasing the resistance to a maximum impossible differential attack in the generalized Feistel structure.

Thus, there is much to be desired in the art.

According to a first aspect of the present invention, there are provided an encryption method and a decryption method corresponding to the encryption method in each of which: by using a generalized Feistel structure in which data is divided into n pieces and mixing processing with key data is performed, diffusion processing, in which data transformation via linear operation is executed, is performed at least once between rounds of the generalized Feistel structure.

According to a second aspect of the present invention, there are provided an encryption device and a decryption device corresponding to the encryption device each comprising: a generalized Feistel structure in which data is divided into n pieces and mixing processing with key data is performed; and at least one diffusion processing unit, which performs data transformation via linear operation, between rounds of the generalized Feistel structure.

According to a third aspect of the present invention, there are an encryption program (computer readable program) and a decryption program (computer readable program) corresponding to the encryption program, each causing a computer system to perform: non-linear transformation processing a plurality of number of times using a generalized Feistel structure in which data is divided into n pieces and mixing processing with key data is performed; and diffusion processing, in which data transformation via linear operation is performed, at least once between rounds of the generalized Feistel structure.

The meritorious effects of the present invention are summarized as follows.

The present invention increases the resistance to an impossible differential attack and, at the same time, reduces the encryption/decryption processing time without increasing the number of rounds of the whole encryption processing. The reason is that diffusion processing, which performs data transformation through linear operation, is provided between the rounds of the generalized Feistel structure to suppress an increase in the maximum number of impossible differential rounds in the generalized Feistel structure.

BRIEF DESCRIPTION OF THE DRAWINGS

FIG. 2 is a diagram showing, in a matrix form, a processing of diffusion processing unit in the first exemplary embodiment of the present invention.

FIG. 3 is another diagram showing, in a matrix form, a processing of diffusion processing unit in the first exemplary embodiment of the present invention.

FIG. 11 is a diagram showing an example of the MDS matrix.

FIG. 17 is a diagram showing the relation between the number of divisions N and the number of impossible differential rounds in the generalized Feistel structure.

PREFERRED MODES

Next, preferred exemplary embodiments of the present invention will be described more in detail below with reference to the drawings.

First Exemplary Embodiment

Figure 1:
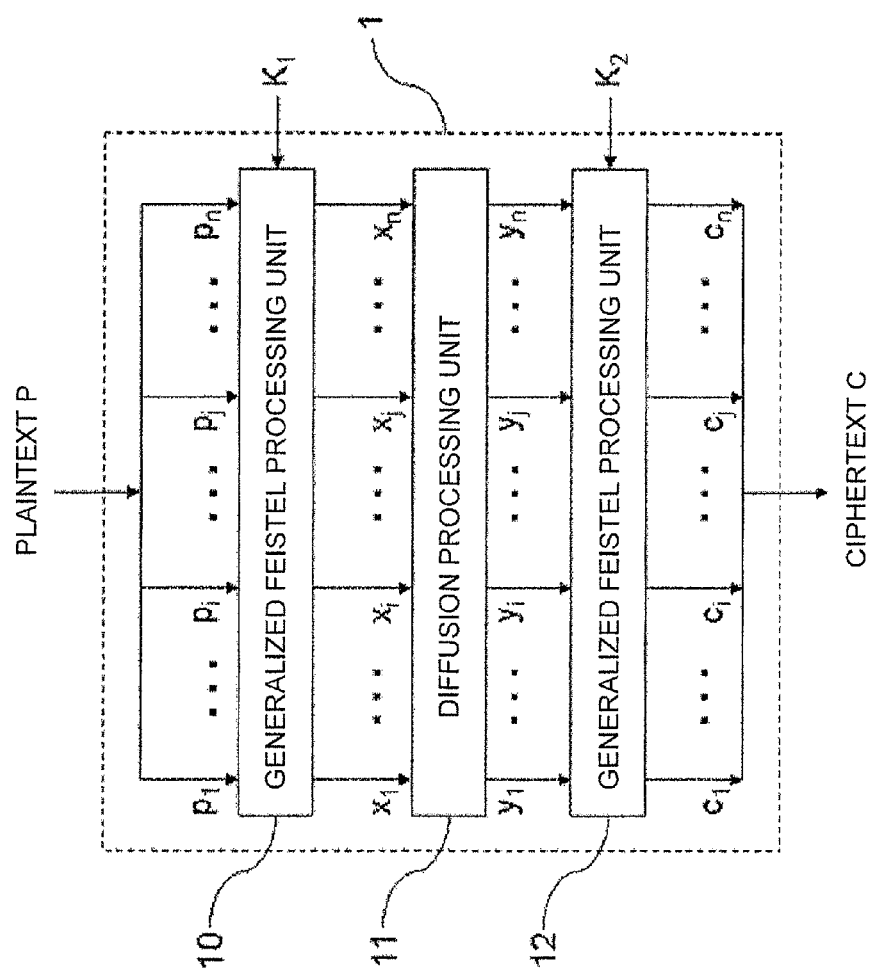
FIG. 1 is a diagram showing a configuration of encryption unit (encryption device) in a first exemplary embodiment of the present invention.

FIG. 1 is a diagram showing the configuration of encryption unit (encryption device) in a first exemplary embodiment of the present invention. Referring to FIG. 1, encryption unit 1 is shown that has a configuration in which diffusion processing unit 11 is provided between generalized Feistel processing unit 10 and 12 each constituting a generalized Feistel structure.

Plaintext P is divided into $p_1$-$p_n$, which are input to the generalized Feistel processing unit 10 and, after that, processed sequentially by the diffusion processing unit 11 and the generalized Feistel processing unit 12. The output data $c_1$-$c_n$ of the last-stage generalized Feistel processing unit 12 is combined into ciphertext C.

Each of the generalized Feistel processing unit 10 and 12 is configured by one or more rounds of Type-I or Type-II n-way generalized Feistel structures that perform non-linear transformation using the key data $K_1$ and $K_2$.

The diffusion processing unit 11, which performs linear operation for two or more of inputs $x_1$-$x_n$ to produce each output $y_i$, is represented by the n×n matrix operation shown in FIG. 2.

The elements of the matrix must be selected so that the diffusion processing unit 11 becomes bijective, and the condition that the matrix has an inverse matrix must be satisfied. That is, when the matrix is M and the identity matrix is I, the matrix must have the inverse matrix $M^{-1}$ that satisfies $M \cdot M^{-1} = I$.

Whether or not the matrix M has an inverse matrix may be checked by checking the rank using "Gaussian elimination". If rank(M)=n, the matrix M has an inverse matrix.

The diffusion processing unit 11 may also be configured in such a way that the input data is divided into several groups as shown in FIG. 3 and, for each group, the matrix operation is performed for a predetermined number of pieces of data out of n pieces of input data.

Note that, when a plurality of diffusion processing units are arranged in parallel as shown in FIG. 3, it is also required for each matrix to have an inverse matrix as described above. Although the diffusion efficiency of the whole diffusion processing units is decreased, this configuration reduces the operation amount of the whole configuration.

Figure 4:
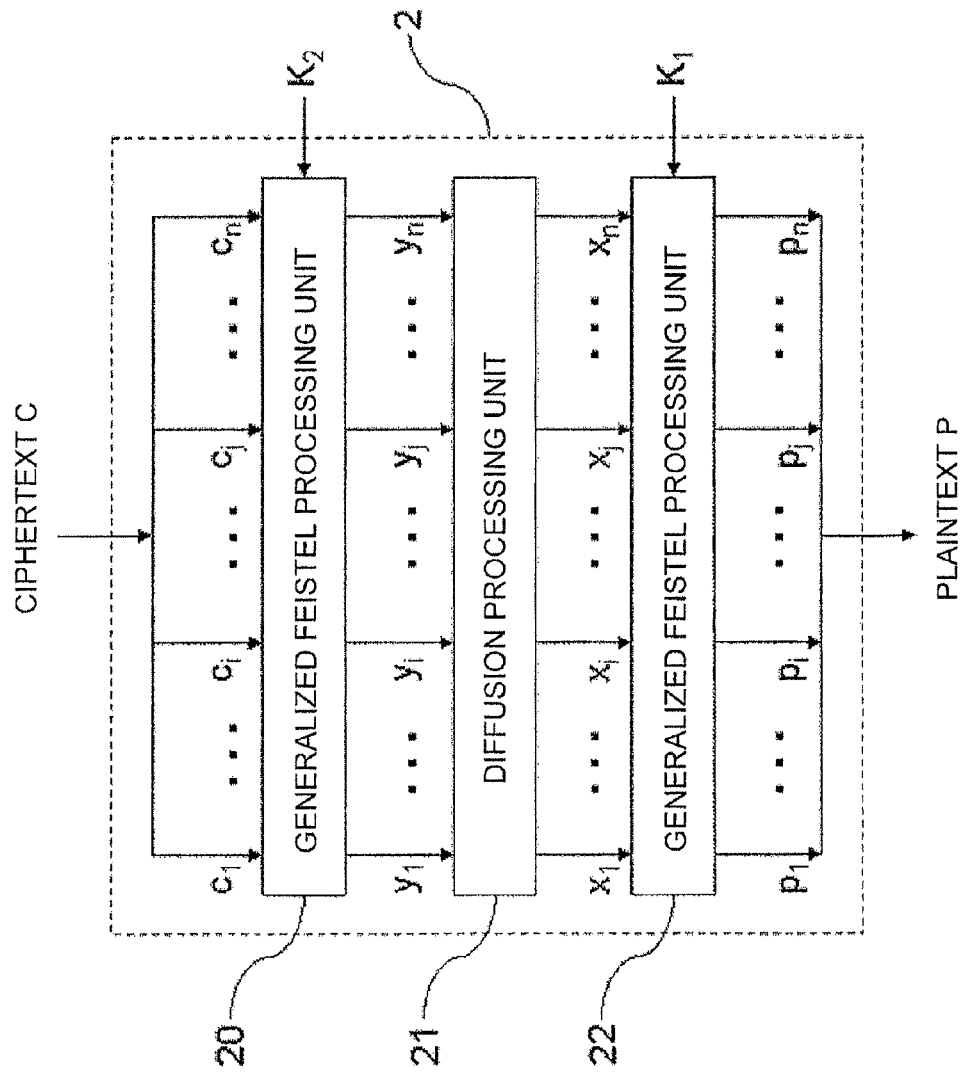
FIG. 4 is a diagram showing a configuration of decryption unit (decryption device) in the first exemplary embodiment of the present invention.

FIG. 4 is a diagram showing the configuration of decryption unit 2 corresponding to the encryption unit 1 shown in FIG. 1. Referring to FIG. 4, the decryption unit 2 is shown that has a configuration in which diffusion processing unit 21 is provided between generalized Feistel processing unit 20 and 22 each constituting a generalized Feistel structure.

Each of the generalized Feistel processing unit 20 and 22 shown in FIG. 4 is configured by one or more rounds of Type-I or Type-II n-way generalized Feistel structures and is the inverse function of the generalized Feistel processing unit 12 and 10, shown in FIG. 1, respectively. The diffusion processing unit 21 shown in FIG. 4 is the inverse function of the diffusion processing unit 11 shown in FIG. 1.

The diffusion processing unit 21 is the inverse matrix of the matrix of the diffusion processing unit 11 shown in FIG. 1. Here, if the matrix M satisfies the relation $M = M^{-1}$, the diffusion processing unit may be shared by the encryption processing and the decryption processing.

Ciphertext C is divided into $c_1$-$c_n$ which are input to the generalized Feistel processing unit 20 and, after that, processed sequentially by the diffusion processing unit 21 and the generalized Feistel processing unit 22. Output data $p_1$-$p_n$, which is the output of the last-stage generalized Feistel processing unit 22, is combined into plaintext P.

A usual Feistel structure, where the number of divisions n is 2, allows a structure to be shared by the encryption processing and the decryption processing and, as a result, allows encryption/decryption to be performed simply by reversing the order in which the keys (round keys) are used for the round processing.

Figure 5:
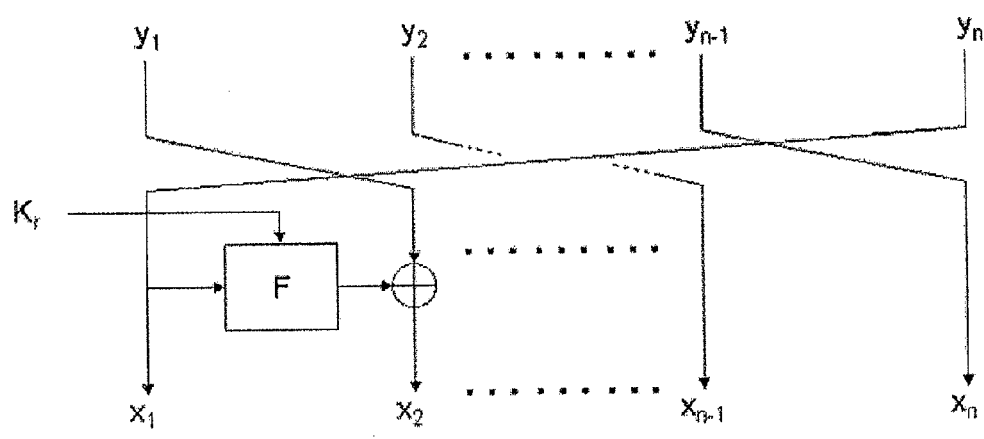
FIG. 5 is a diagram showing an example of a decryption processing of the Type-I generalized Feistel structure.

On the other hand, in the Type-I generalized Feistel structure of three or more ways, the order in which the round keys are used must be reversed and, at the same time, data must be crossed in the direction opposite to the direction of encryption. This requirement makes it impossible for the structure to be shared by the encryption processing and the decryption processing (see FIG. 5).

Figure 6:
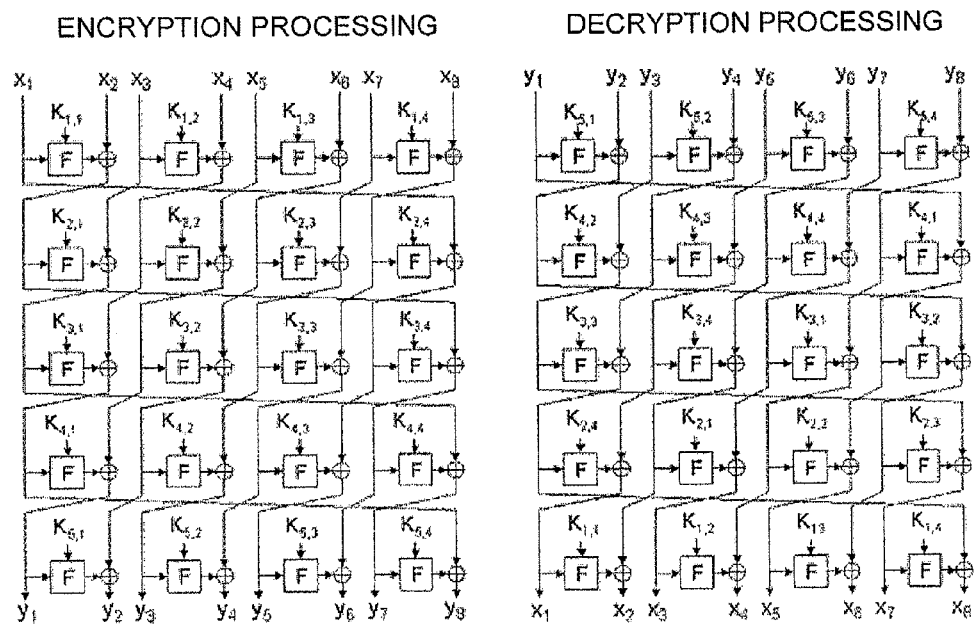
FIG. 6 is a diagram showing the key usage order in the encryption and decryption of the Type-II generalized Feistel structure.
Figure 10:
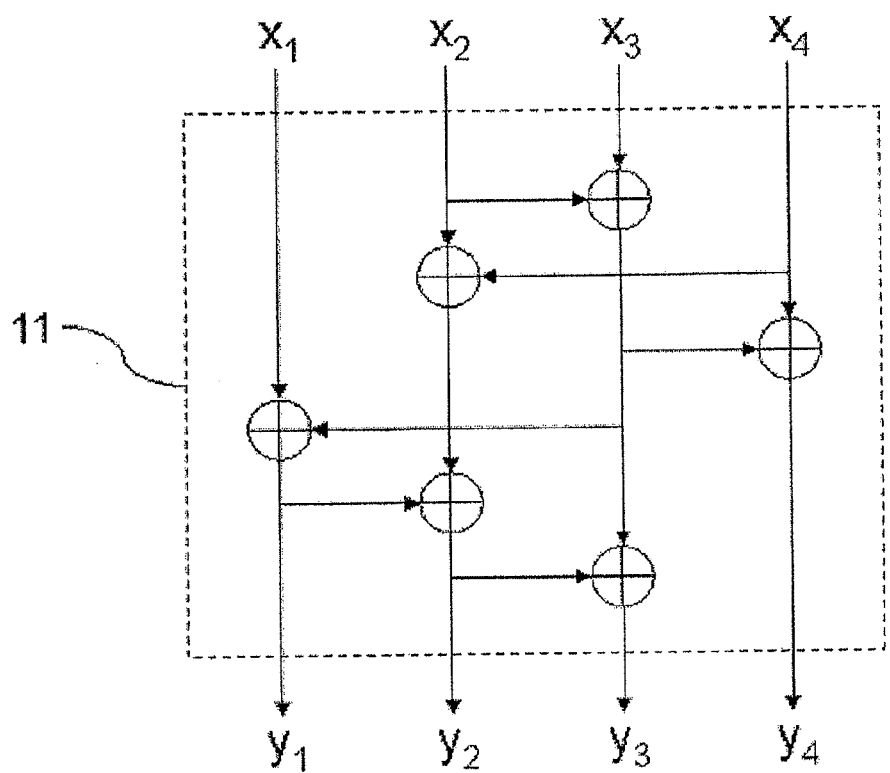
FIG. 10 is a diagram showing an example of a configuration of the diffusion processing unit shown in FIG. 9.

In contrast, because 2/n non-linear transformations are performed in the Type-II generalized Feistel structure, the structure itself may be shared depending upon the number of rounds. In this case, too, the round keys must be used in the reverse order of those in the encryption processing as shown in FIG. 10 and, in addition, some round keys must be rotated within the round keys (for example, see the second round of the encryption processing and the fourth round of the decryption processing in FIG. 6).

Because data is mixed by the diffusion processing unit in this exemplary embodiment as described above, the resistance to an impossible differential attack is increased without increasing the number of rounds in the whole encryption processing. In other words, because the number of rounds may be reduced while maintaining the resistance to an impossible differential attack, the encryption processing time may also be reduced.

Second Exemplary Embodiment

Figure 7:
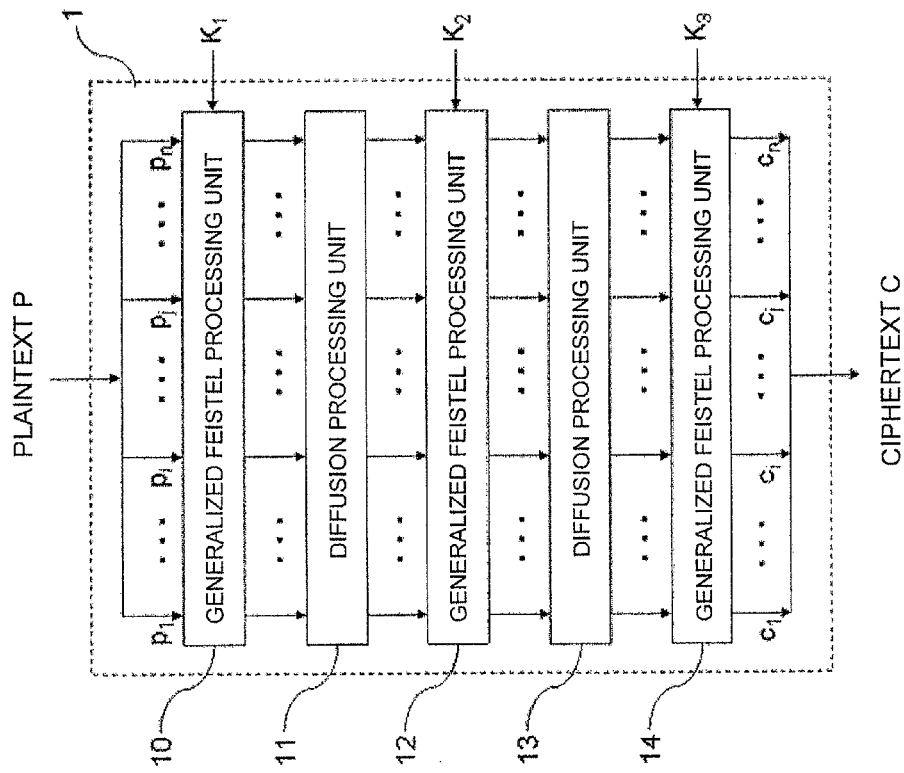
FIG. 7 is a diagram showing a configuration of encryption unit (encryption device) in a second exemplary embodiment of the present invention.

Next, a second exemplary embodiment of the present invention, in which two stages of diffusion processing unit are provided, will be described. FIG. 7 is a diagram showing a configuration of encryption unit in the second exemplary embodiment of the present invention. Referring to FIG. 7, encryption unit 1 is shown that has the configuration in which diffusion processing unit 11 and 13 are provided between generalized Feistel processing unit 10, 12, and 14 each constituting a generalized Feistel structure.

Figure 8:
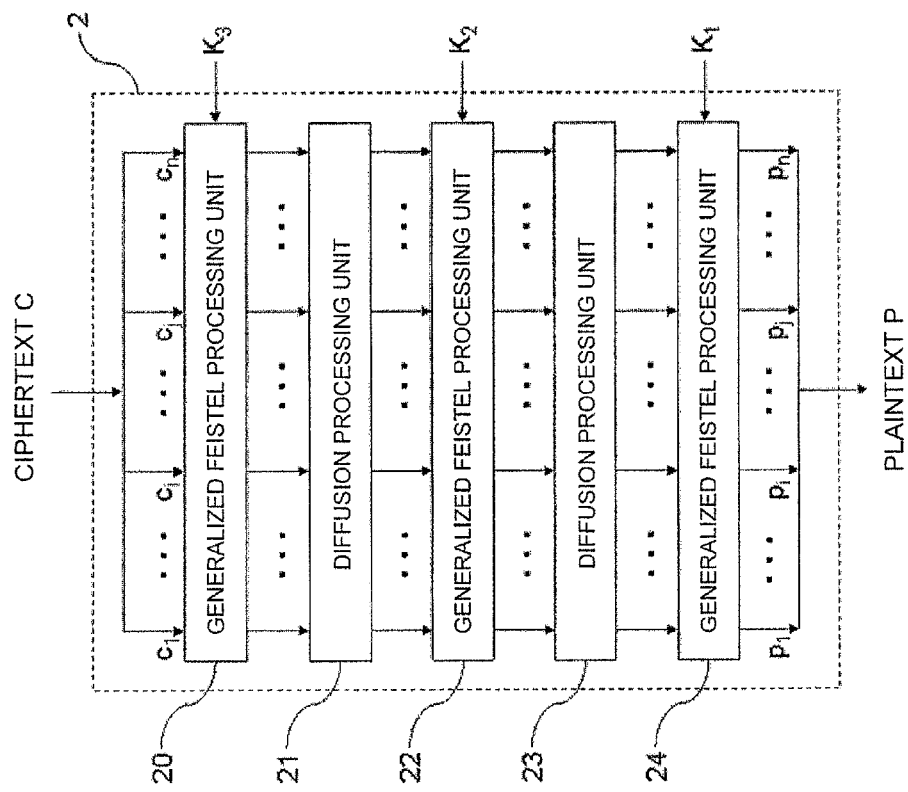
FIG. 8 is a diagram showing a configuration of decryption unit (decryption device) in the second exemplary embodiment of the present invention.

FIG. 8 is a diagram showing a configuration of decryption unit corresponding to the encryption unit shown in FIG. 7. Referring to FIG. 8, decryption unit 2 is shown that has a configuration in which diffusion processing unit 21 and 23 are provided between generalized Feistel processing unit 20, 22, and 24 each constituting a generalized Feistel structure.

This exemplary embodiment is similar to the first exemplary embodiment described above except that the diffusion processing unit is inserted into two positions. That is, in the present invention, there is no limit on the number of diffusion processing unit that is added, and the diffusion processing unit may be provided according to the number of rounds and to the required resistance to an impossible differential attack.

First Example

Figure 9:
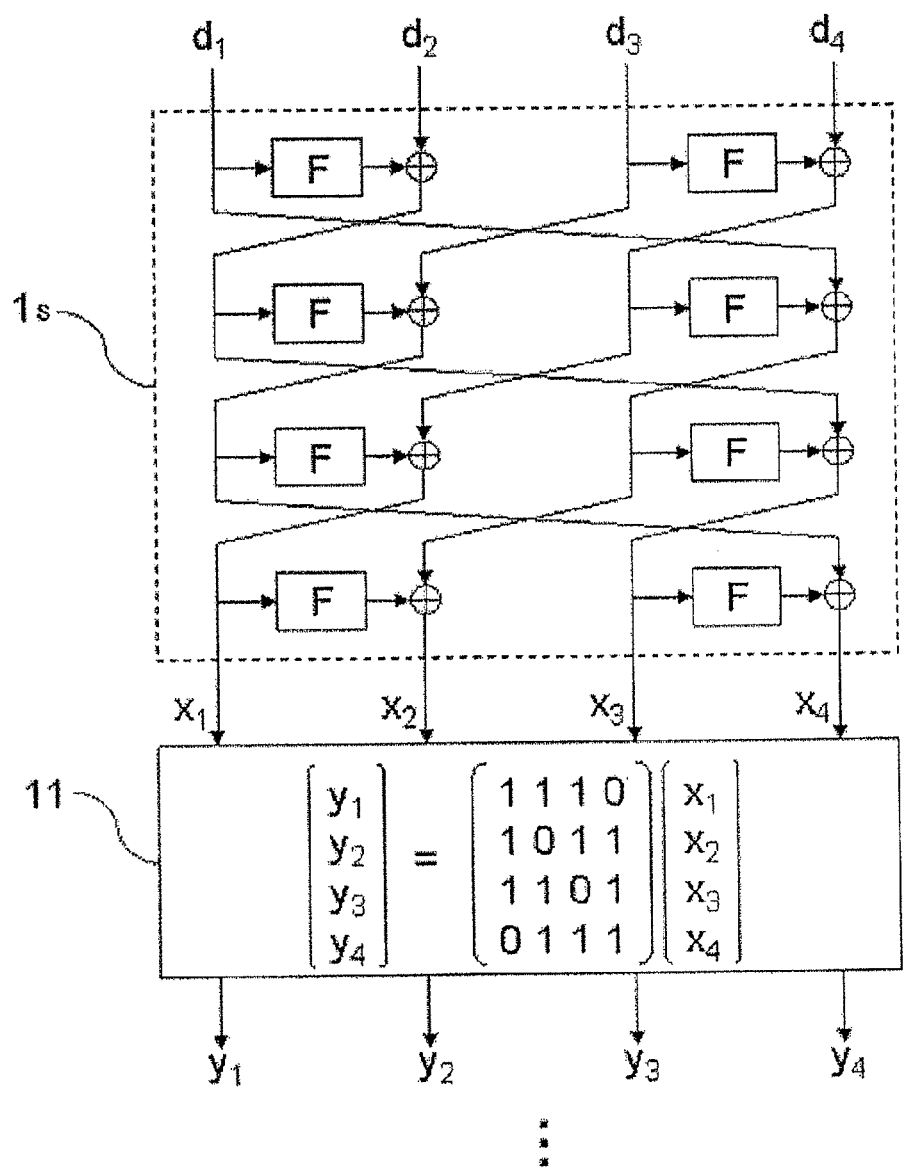
FIG. 9 is a diagram showing a configuration of an encryption unit (encryption device) constructed by a four-way generalized Feistel structure and a 4×4 matrix in the first exemplary embodiment of the present invention.

Next, the following describes a preferred mode for carrying out the present invention using a concrete example. FIG. 9 is a diagram showing an example of the encryption processing unit configured by 4-way Type-II generalized Feistel processing unit 1s and diffusion processing unit 11 composed a 4×4 matrix.

In the matrix of the diffusion processing unit 11 shown in FIG. 9, each output is affected (exerted) by three inputs. Although the matrix of the diffusion processing unit 11, expressed as an expression, performs eight exclusive OR operations to calculate the output, a simpler configuration is also possible such as the one shown in FIG. 10 in which six exclusive OR operations are performed (see Non-Patent Document 2). The entire disclosed contents of Non-Patent Document 2 given above are hereby incorporated by reference into this description.

In addition, the Maximum Distance Separable (MDS) matrix, such as the one shown in FIG. 11, may also be used as the diffusion processing unit 11. The expressions at the bottom of FIG. 11 indicate that the matrix of this type, which does not include a 0-element and whose rows are different from one another (each row is unique), causes each of outputs to be affected by all the inputs, providing a better diffusion effect than that of the diffusion processing unit 11.

For an MDS matrix of two or more elements, multiplication on a finite field GF($2^m$) is performed (m is block size/n).

Second Example

Figure 12:
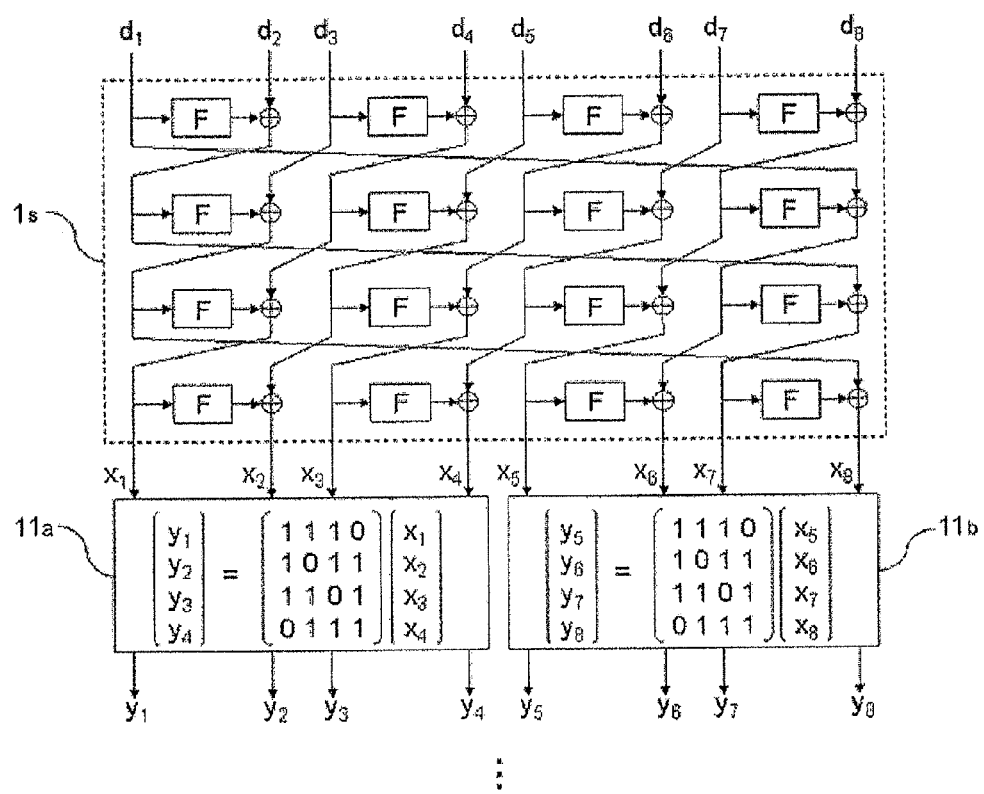
FIG. 12 is a diagram showing the configuration of an encryption unit (encryption device) constructed by an eight-way generalized Feistel structure and two 4×4 matrices in the second exemplary embodiment of the present invention.

FIG. 12 is a diagram showing an example of encryption processing unit configured by an eight-way Type-II generalized Feistel processing unit 1s and two diffusion processing unit 11a and 11b each composed of a 4×4 (4 rows×4 columns) matrix.

Although, in the example shown in FIG. 12, the matrices used in the diffusion processing units 11a and 11b are the same matrix, different matrices may also be used.

The encryption method and the description method described in the above exemplary embodiments and the examples of the present invention may be implemented by a program for executing the generalized Feistel processing and the diffusion processing on a computer such as a personal computer, an IC card, and a reader/writer or may be implemented by a hardware circuit installed in the various information processing devices described above.

Figure 13:
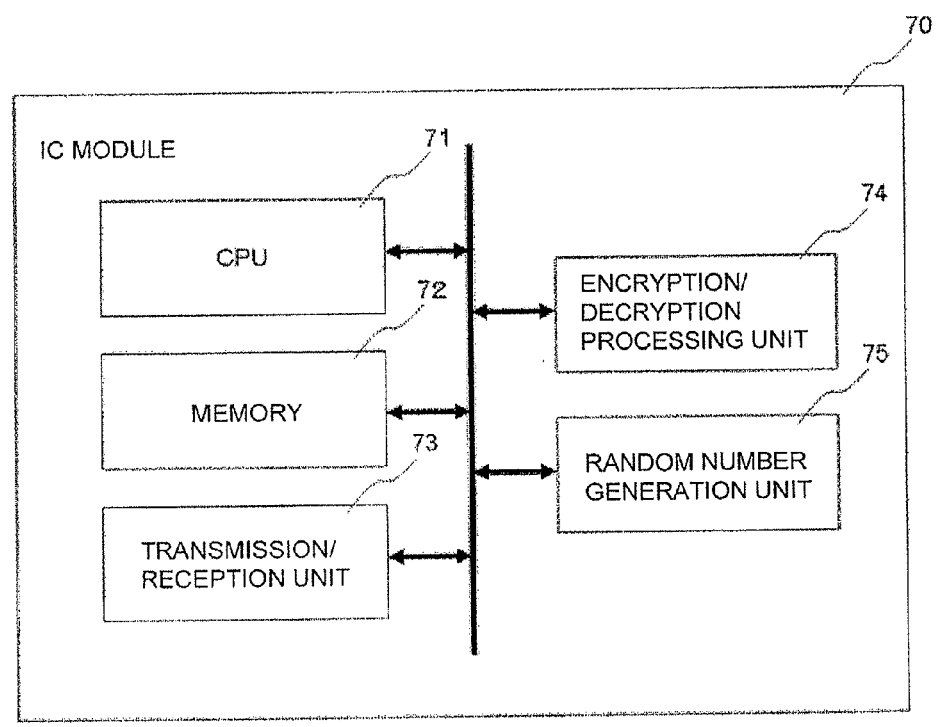
FIG. 13 is a diagram showing an example of an information processing device (IC module) in which an encryption device and a description device of the present invention are installed.

FIG. 13 is a diagram showing an IC module 70 that is a concrete example of the encryption device and the description device of the present invention. A CPU (Central Processing Unit) 71 shown in FIG. 13 is a processor that starts or terminates encryption/decryption processing, controls data transmission/reception, controls data transfer between components, and executes other various programs.

A memory 72 is a ROM (Read Only Memory) in which programs to be executed by the CPU 71 and fixed data such as operation parameters are stored and a RAM (Random Access Memory) etc. used as a storage area and work area of the programs to be executed on the CPU 71 or parameters that are changed as necessary during the processing of the programs.

The memory 72 is used also as the storage area of key data and matrix data required for the generalized Feistel processing and the diffusion processing. These data storage areas are preferably configured as a memory having a tamper resistant structure.

A transmission/reception unit 73 is a data communication processing unit that carries out data communication with the external and, for example, data communication with an external reader/writer (exchange of encrypted data) etc.

An encryption/decryption processing unit 74 performs the above-described encryption processing and decryption processing, in which the diffusion processing is included between the Feistel structures, for data to be transmitted or received via the transmission/reception unit 73.

A random number generation unit 75 performs the random number generation processing required for generating keys required for the encryption/decryption processing.

Though configured as an independent unit in the example shown in FIG. 13, the encryption/decryption processing unit may be configured in such a way that the programs for executing the generalized Feistel processing and the diffusion processing are stored in the memory 72 to allow the CPU to read them for execution so that they function as the encryption means or the decryption means.

Figure 14:
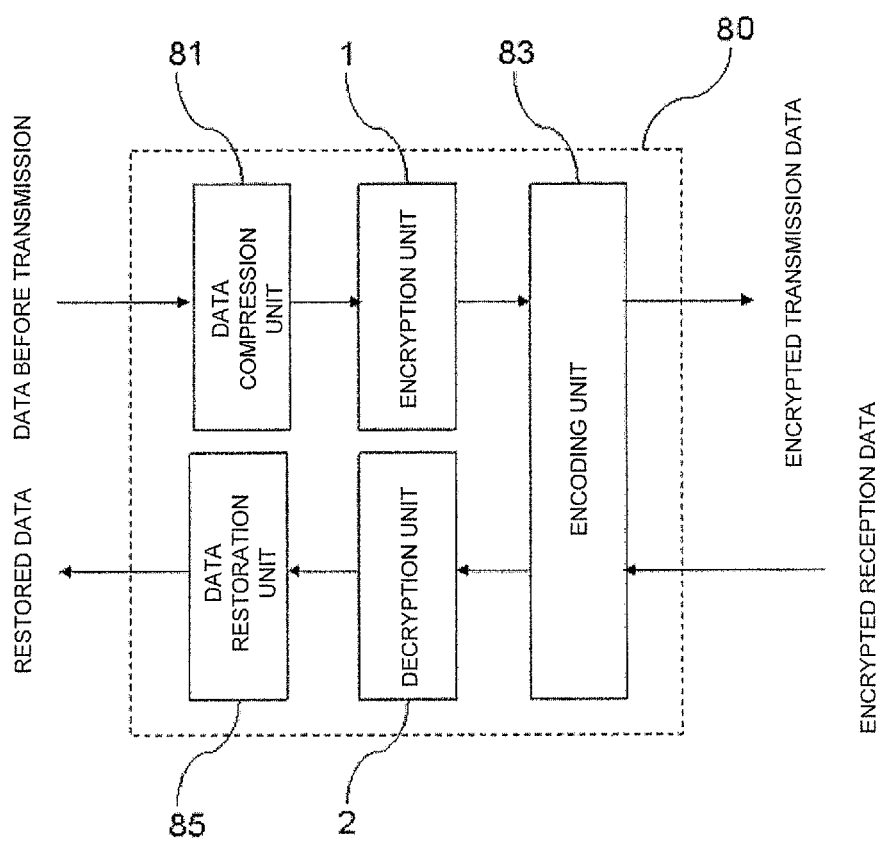
FIG. 14 is a diagram showing an example of an information processing device (communication device) in which an encryption device and a decryption device of the present invention are installed.
Figure 15:
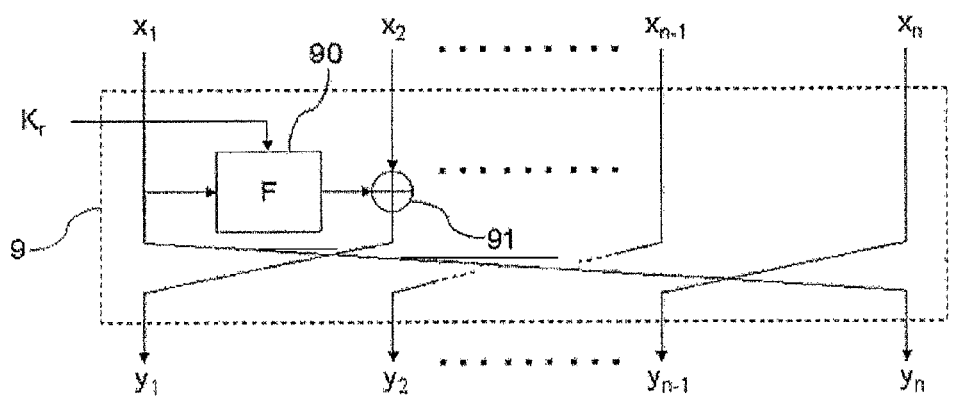
FIG. 15 is a diagram showing the generalized Feistel structure (Type-I).
Figure 16:
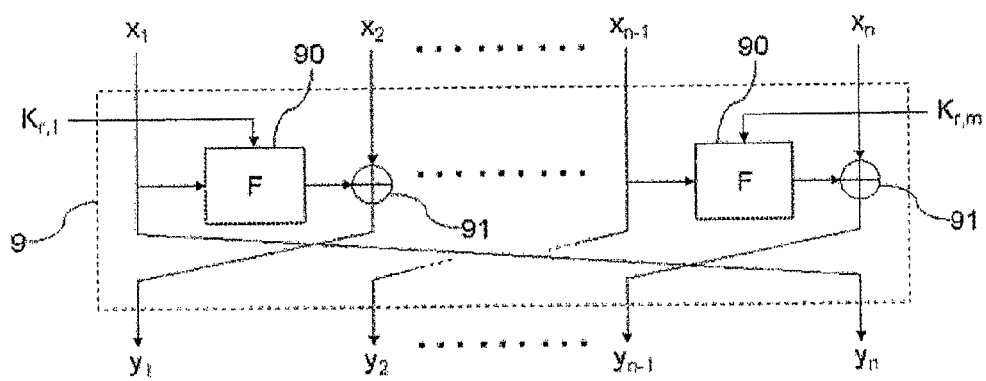
FIG. 16 is a diagram showing the generalized Feistel structure (Type-II).
Figure 18:
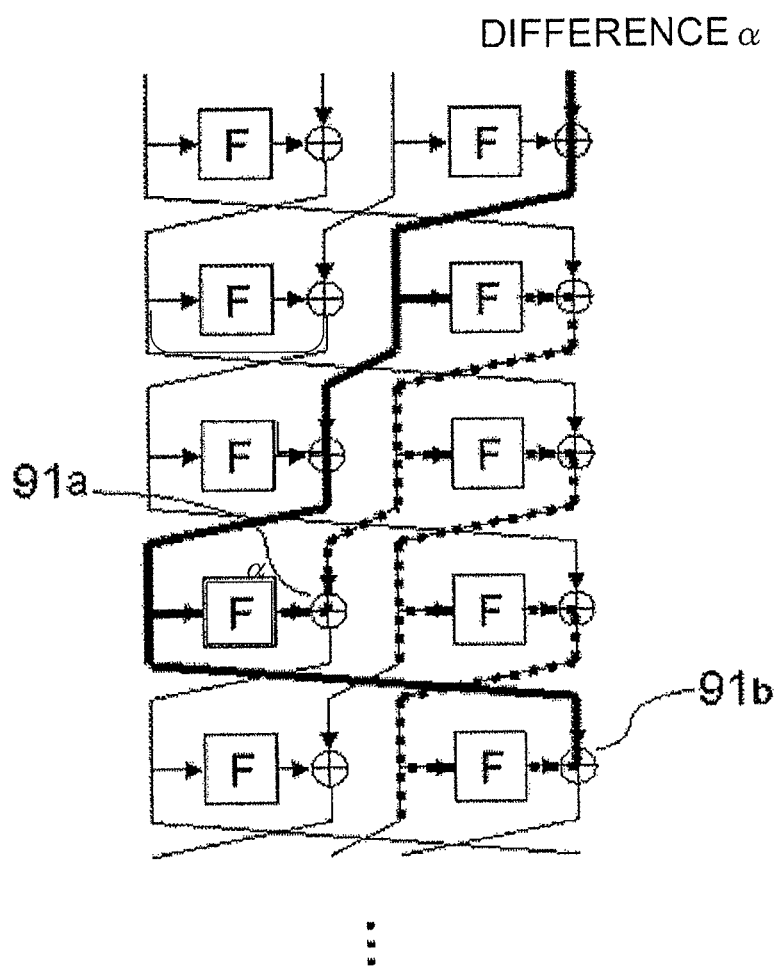
FIG. 18 is a diagram showing an example of propagation of a difference in a 4-way generalized Feistel structure.

In addition to the IC module described above, the present invention is applicable also to other uses such as an encryption/decryption device for concealing communication data transmitted or received by a voice communication terminal or a data communication device. FIG. 14 is a diagram showing an example of the data processing unit of a communication device that carries out communication with communication data, such as voices or the like, concealed.

When data is transmitted, data compression means 81 first compresses data before the transmission as shown in FIG. 14. Next, the compressed data P is encrypted by the encryption means 1 of the present invention. Finally, data C, encrypted by encoding means 83, is error-correction encoded, and the encrypted transmission data is transmitted.

When data is received, the encoding means 83 performs error correction for encrypted reception data. The error-corrected data C is decrypted by the decryption means 2 of the present invention. Finally, data restoration means 85 decompresses the compressed data for generating restored data.

While the preferred exemplary embodiments of the present invention have been described, it is to be understood that the present invention is not limited to the description of the exemplary embodiments and examples above and that further modifications, replacements, and adjustments may be added within the scope of the basic technological concept of the present invention.

For example, a sequence of processing described in the exemplary embodiments and examples above may be configured by hardware or software or by a combination of both and may be changed as necessary according to the use in a system to which the present invention is applied.

The encryption program or the decryption program of the present invention may be distributed in the form of various recording media, such as a hard disk, a flexible disk, a CD-ROM (Compact Disc Read Only Memory), an MO (Magneto Optical) disc, a DVD (Digital Versatile Disc), or a semiconductor memory, for execution on a computer.

The encryption program or the decryption program described above may also be stored in a file server on a network for downloading as necessary.

The exemplary embodiments and the examples may be changed and adjusted within the scope of the entire disclosure (including claims) of the present invention and based on the basic technological concept. Within the scope of the claims of the present invention, various disclosed elements may be combined and selected in a variety of ways. That is, the present invention of course includes various modifications and changes that may be made by those skilled in the art in accordance with the entire disclosure, including claims, and the technical concept.

What is claimed is:

1. An encryption/decryption method, wherein:
by using a generalized Feistel structure in which data is divided into n pieces and mixing processing with key data is performed, diffusion processing, in which data transformation via linear operation is executed, is performed at least once between rounds of said generalized Feistel structure under control of a hardware processor, wherein
in said diffusion processing,
linear transformation is performed in which each of n pieces of output data is operated on by two or more pieces of input data, by using an exclusive OR, the linear transformation being placed between rounds of the generalized Feistel structure to compensate for weakness of a diffusion of the generalized Feistel structure, and
wherein the method is adapted for encryption or decryption.

2. The encryption/decryption method as defined by claim 1, wherein in said diffusion processing, the n pieces of input data are divided into two or more groups and data transformation via linear operation is performed for each group.

3. An encryption/decryption device, comprising:
a hardware processor;
a generalized Feistel structure in which data is divided into n pieces and mixing processing with key data is performed; and
at least one diffusion processing unit, under control of the hardware processor, which performs data transformation via linear operation, between rounds of said generalized Feistel structure, wherein
said diffusion processing unit
performs linear transformation in which each of n pieces of output data is operated on by two or more pieces of input data, by using an exclusive OR, the linear transformation being placed between rounds of the generalized Feistel structure to compensate for weakness of a diffusion of the generalized Feistel structure; and
wherein said device is adapted for encryption or decryption.

4. The encryption/decryption device as defined by claim 3:
said diffusion processing unit comprises a plurality of diffusion processing units each of which receives a predetermined number of data pieces out of the n pieces of input data, and
each of said diffusion processing units performs data transformation via linear operation for the predetermined number of data pieces.

5. A non-transitory computer readable medium storing an encryption program that causes a computer to perform:
non-linear transformation processing a plurality of times using a generalized Feistel structure in which data is divided into n pieces and mixing processing with key data is performed; and
diffusion processing, in which data transformation via linear operation is performed, at least once between rounds of said generalized Feistel structure, wherein
in said diffusion processing,
linear transformation processing is performed in which each of n pieces of output data is operated on by two or more pieces of input data, by using an exclusive OR, the linear transformation being placed between rounds of the generalized Feistel structure to compensate for weakness of a diffusion of the generalized Feistel structure; and
wherein said program is adapted for encryption or decryption.

6. The non-transitory computer readable medium as defined by claim 5 wherein:
in said diffusion processing, the n pieces of input data are divided into two or more groups and data transformation via linear operation is performed for each group.

7. An information processing device that has a function to perform an encryption/decryption method for encrypting or decrypting data,
wherein the information processing device comprises a hardware processor,
wherein in the encryption/decryption method, by using a generalized Feistel structure in which data is divided into n pieces and mixing processing with key data is performed, diffusion processing, in which data transformation via linear operation is executed, is performed at least once between rounds of said generalized Feistel structure under control of the hardware processor,
wherein in said diffusion processing, linear transformation is performed in which each of n pieces of output data is operated on by two or more pieces of input data, by using an exclusive OR, the linear transformation being placed between rounds of the generalized Feistel structure to compensate for weakness of a diffusion of the generalized Feistel structure, and
wherein the method is adapted for encryption or decryption.

8. The information processing device as defined by claim 7, wherein in said diffusion processing, the n pieces of input data are divided into two or more groups and data transformation via linear operation is performed for each group.

* * * * *